Jan. 10, 1933.  F. O. WELLS  1,893,688
METHOD OF MAKING THREAD CUTTING DIES
Filed Oct. 23, 1929

INVENTOR
Frank O. Wells
BY
Janney, Blair & Curtis
ATTORNEY

Patented Jan. 10, 1933

1,893,688

UNITED STATES PATENT OFFICE

FRANK O. WELLS, OF GREENFIELD, MASSACHUSETTS

METHOD OF MAKING THREAD CUTTING DIES

Application filed October 28, 1929. Serial No. 401,708.

This invention relates to thread cutting dies and methods of making the same.

Among other objects the invention is intended to provide an efficient and durable thread cutting die and an efficient and economical method of making the same.

Other objects will be in part obvious and in part pointed out hereinafter.

One illustrative embodiment of the invention is shown in the accompanying drawing in which.

Heretofore thread cutting dies have been produced from a rod or bar of steel by expensive milling and drilling operations, such operations not only requiring much time and labor but also resulting in a considerable loss of material. The present invention contemplates the production of thread cutting dies by inexpensive forging and punching operations.

The present invention also contemplates the production of a thread cutting die having spiral-shaped thread cutting lands instead of the straight-line thread cutting lands heretofore employed.

Figure 7:
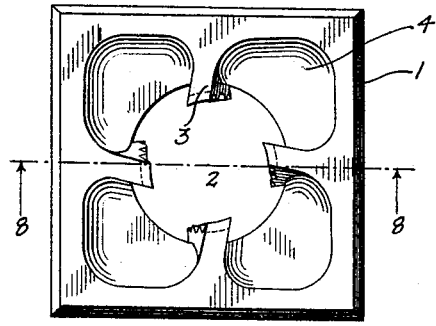
Fig. 7 is a top plan view of the blank of Fig. 5 after the threads have been cut on the lands.
Figure 8:
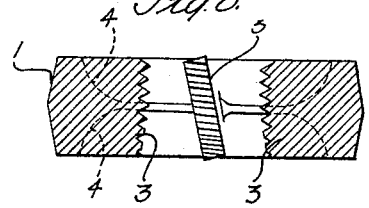
Fig. 8 is a sectional view taken on the line 8—8 of Fig. 7.

As shown in Figs. 7 and 8, the illustrative thread cutting die comprises a body portion 1 preferably of hardened steel provided with a central opening 2 into which a plurality of thread cutting lands 3 extend.

The lands 3 are preferably spaced equal distances apart and are spiral-shaped to increase their cutting efficiency. Recesses 4 are preferably formed between adjacent lands 3 on either side of the die to provide adequate chip room.

The thread cutting die just described is preferably produced by the series of steps now to be described.

Figure 1:
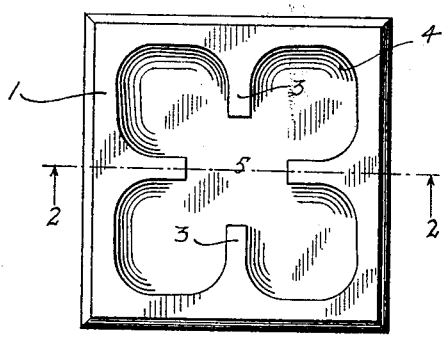
Fig. 1 is a top plan view of a die blank forged from a rod or bar of steel.
Figure 3:
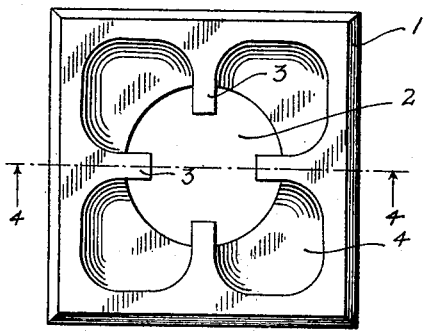
Fig. 3 is a top plan view of the die blank after the web portion between the lands has been removed.
Figure 2:
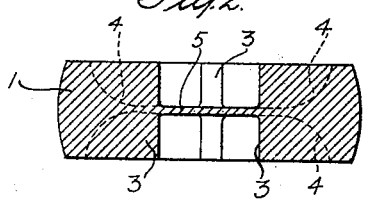
Fig. 2 is a sectional view taken on the line 2—2 of Fig. 1.
Figure 4:
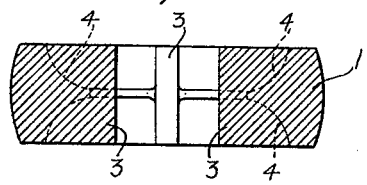
Fig. 4 is a sectional view taken on the line 4—4 of Fig. 3.

A steel rod or bar suitably heated is subjected to the operation of a drop forging machine having forging dies adapted to produce the die blank shown in Figs. 1 and 2; said blank having as the immediate result of the forging operation the recesses 4 and lands 3 connected by a thin web of metal 5.

The thin web 5 is then removed, preferably by a punching operation, to provide the central opening 2.

Figure 5:
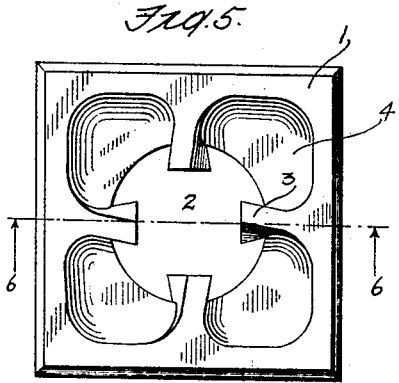
Fig. 5 is a top plan view of the blank after the lands have been twisted into spiral form.
Figure 6:
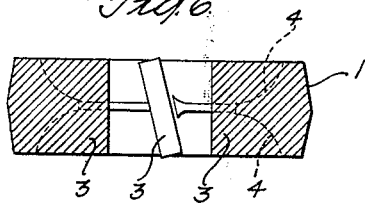
Fig. 6 is a sectional view taken on the line 6—6 of Fig. 5.

Following the forging and punching operations and while the blank is in a softened condition, the lands 3 are twisted into spiral form as shown in Figs. 5 and 6. The blank is then relieved, threaded, tempered and polished to produce the finished die shown in Figs. 7 and 8.

Among other advantages the invention provides an efficient and durable thread cutting die and an inexpensive method of producing the same. Forging the die blank to produce the lands and recesses reduces substantially the labor and material cost. Twisting the lands while in softened condition further reduces the cost of production. Spiraling the thread cutting lands increases the cutting efficiency of the threads and prolongs the life of the die. The forging operation compresses the land forming material and increases its wearing qualities.

It will be understood that the invention is not to be limited to the particular embodiment thereof shown for purposes of illustration and that all of the features of the invention need not be used conjointly, as the invention may be variously embodied and the inventive features thereof may be used in different combinations and sub-combinations, as defined in the subjoined claims.

I claim

1. The method of making a one-piece thread cutting die which is characterized by forging a die blank from a block of metal of a thickness equal to the finished die and to produce as the immediate result of the forging operation a die blank having a plurality of lands temporarily connected by a thin web of metal, removing the said web between the ends of the lands while the blank is still soft, twisting the lands into spiral form, and forming threads on the lands.

2. The method of making a one-piece thread cutting die which is characterized by forging a die blank from a block of metal which is of a thickness equal to the finished die and to produce as the immediate result of the forging operation a die blank having oppositely disposed recesses and lands connected by a thin web of metal, removing the web between the ends of the lands and a portion of the web between adjacent lands, twisting the lands into spiral form and of a length equal to the original thickness of the die blank, and forming threads on the lands.

3. The method of forming a one-piece thread cutting die from a blank of a thickness to produce the finished die which consists in first forging depressions in the opposite sides of the blank to produce a plurality of lands, that are connected with a thin web, then removing a portion of the thin web, then twisting the lands into inclined positions with their opposite ends substantially in the planes of the opposite faces of the die blank, then forming threads on the lands.

In testimony whereof, I have signed my name to this specification this 16th day of October, 1929.

FRANK O. WELLS.